C. OFFENHAUSER.
DRIER AND EVAPORATOR.
APPLICATION FILED FEB. 15, 1919.
1,333,871.
Patented Mar. 16, 1920.
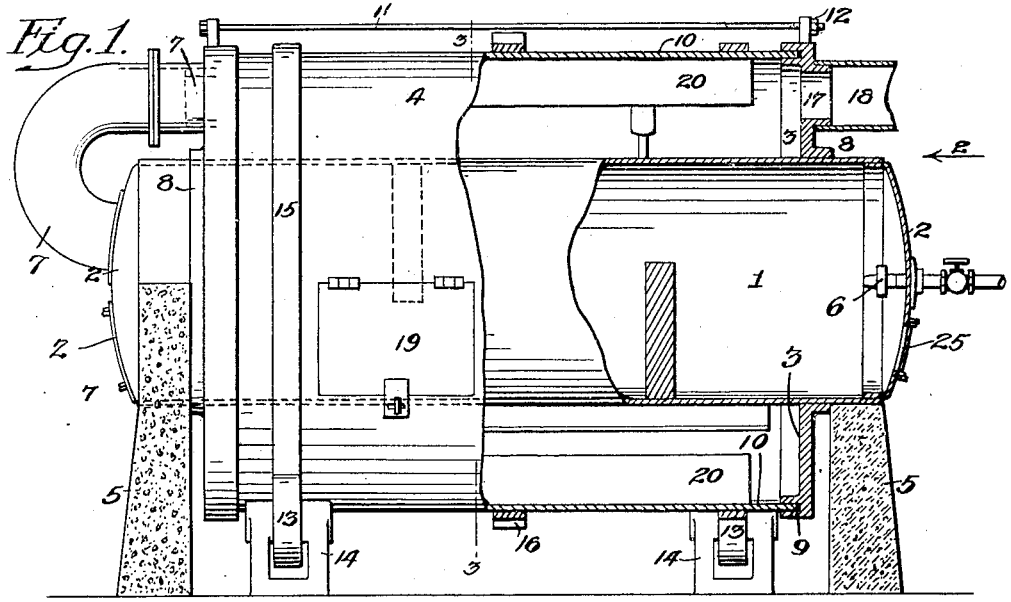
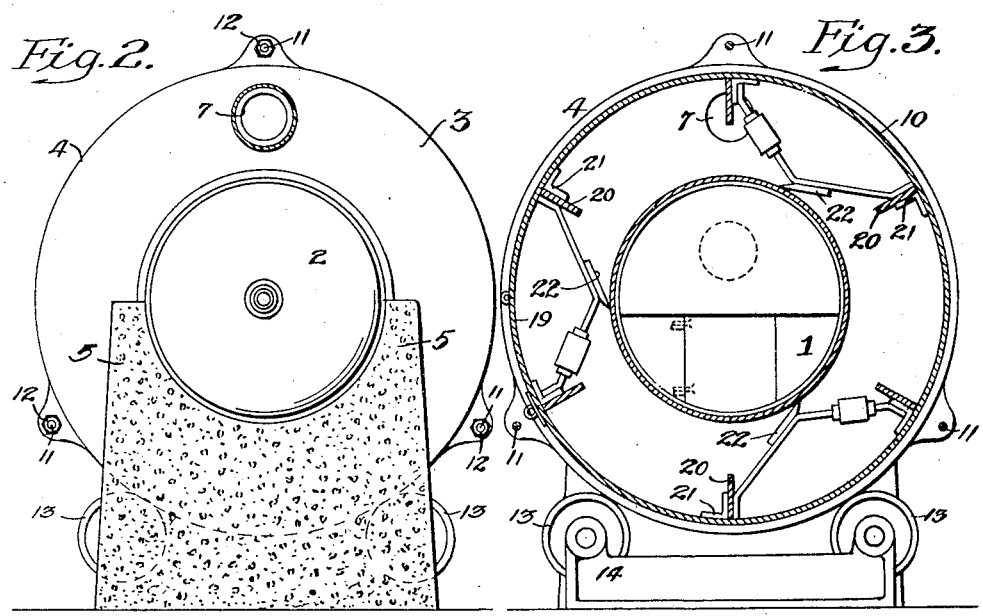
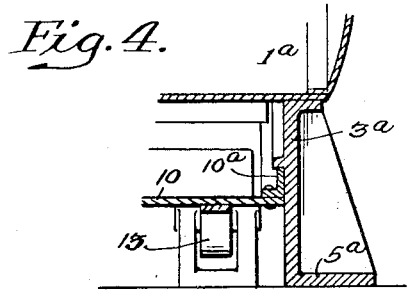
Inventor.
Christopher Offenhauser,
by his Attorneys.
Howson & Howson

UNITED STATES PATENT OFFICE.

CHRISTOPHER OFFENHAUSER, OF PHILADELPHIA, PENNSYLVANIA.

DRIER AND EVAPORATOR.

1,333,871.   Specification of Letters Patent.   Patented Mar. 16, 1920.

Application filed February 15, 1919. Serial No. 277,170.

*To all whom it may concern:*

Be it known that I, CHRISTOPHER OFFENHAUSER, a citizen of the United States, residing in Philadelphia, Pennsylvania, have invented Driers and Evaporators, of which the following is a specification.

My invention relates to certain improvements in driers and evaporators such as that disclosed in the U. S. patent granted to me on December 4, 1917, No. 1,249,177, and one object of my invention is to provide a novel form of rotary machine of the above type which shall be particularly adapted for extracting, evaporating or concentrating liquids, rendering fat or the like, or drying solid materials; the invention contemplating an arrangement in which the heating drum is mounted on a rigid foundation or support and extends entirely through the main drum.

A further object of the invention is to provide a novel form of drier or evaporator in which the main drum has stationary heads so as to allow of the entrance of heated gases and also to permit of the escape of the steam and other gases passing through it and given off from the material under treatment.

These objects and other advantageous ends I attain as hereinafter set forth, reference being had to the accompanying drawings, in which, Figure 1 is a side elevation, partly in vertical section, illustrating my invention;

Fig. 2 is an end elevation taken in the direction of the arrow, Fig. 1;

Fig. 3 is a sectional elevation on the line 3—3, Fig. 1;

Fig. 4 is a fragmentary section illustrating a modification of my invention.

In the above drawings, 1 represents a horizontal heating drum having a head 2 at each end and extending through and beyond the ends 3 of a main drum 4. The projecting portions of this inner drum 1 are fixedly mounted in suitable concrete supports 5 made in any suitable manner so as to firmly hold and support it with the heads or ends 3 of the main drum stationary.

The inner drum 1 may be heated in any suitable manner depending on the temperatures desired and the material under treatment and while steam or powdered or lump fuel may be utilized in this drum, in the present case I have shown it as equipped with a fuel oil burner 6 entering one of the heads 2, and having a conduit 7 at the upper part of the other head to permit of the escape of the products of combustion. This conduit is preferably connected to discharge its gases into the upper part of the main drum 4 whose heads 3 have flanges which may be secured to the inner drum 1 in any suitable manner, each head 3 also having an annular groove 9 near its periphery formed by two flanges spaced apart to provide a groove 9 in which the shell 10 of said main drum 4 is rotatably mounted. The inner drum in addition to the burner 6 will have a door 25 whereby the admission of air may be regulated and access had to the interior of said drum when desired.

The two heads 3 are connected and held together by a series of tie rods 11 preferably having adjusting nuts 12 or turn buckles as desired to permit said heads to be adjusted toward and from each other and toward and from the ends of the shell 10 of the drum 4, so that while this latter can turn freely in said heads its joints therewith are comparatively tight.

The drum 4 is carried independently of the heads 3 by rollers 13 mounted in bearings 14 at each side of the machine as shown in Fig. 3, and these engage annular rails or bands 15 on the drum which is turned through an annular gear 16 engaged by a pinion on a power driven shaft (not shown) whereby it may be slowly rotated. While as above noted the conduit 7 enters one of the heads 3, the other of these heads has an opening 17 which connects with an exhaust pipe 18 for the escape of any steam or vapors which may be given off by the material heated in the main drum 4 as well as to permit of the discharge of the products of combustion from the drum 1.

In the drum 4 are suitable doors 19 through which the material can be loaded and from which it may be discharged after being dried. Any suitable means may be provided for agitating the material and throwing it onto the surface of the inner drum 1 during the rotation of the shell 10. In the present instance I have shown a series of radial blades or shelves 20 projecting inwardly from the surface of the drum 4 and secured to the shell 10 of the drum by angle plates 21, there being also scrapers 22 which are yieldingly connected to the shell of the main drum 4 and arranged to scrape the outer surface of the inner drum 1 so as to keep it comparatively free of solid or semi-solid material.

In Fig. 4 I have shown the head 3ª extended to form a base 5ª for supporting the main drum 1ª and have provided the shell 10 with an internal flange 10ª at each end which is adapted to coöperate with an annular rib on the head 3ª so that in the event of there being considerable liquid in the material under treatment such flange will tend to retain such liquid within the machine until it is evaporated.

Under operating conditions the inner drum 1 is heated to the desired temperature by suitable heating means, in the case shown by oil delivered from the burner 6 and the hot products of combustion are delivered through the conduit 7 to the main drum 4 when they materially assist in the evaporation or drying of the substance under treatment. Such gases with those given off by said substance finally escape from the conduit 18.

The material under treatment is thus dried by being rotated so as to be thrown or dropped onto the heated inner drum, and by being acted on by the hot gases in the main drum 4 which with the steam or other gases due to the drying, are carried off as noted through the fixed head 2. The construction is relatively simple and there is no liability of the material under treatment clogging the entrance or exit openings for the gases. Furthermore, by extending the inner drum 1 beyond the ends of the main drum I avoid the liability of clogging and stoppage of the machine by doing away with joints between fixed and moving parts at or adjacent its axis of rotation, and by extending the inner drum as shown, the full burner and gas escape pipes can be connected to the drum in a convenient manner.

I claim:

1. The combination in a drier and evaporator of a stationary inner heating drum; supports at the ends thereof; an outer drum consisting of a shell and two stationary heads mounted on the inner drum inside the supports; with means for rotating the shell of the outer drum.

2. The combination in a drier and evaporator of a stationary inner heating drum; supports at the ends thereof; an outer drum consisting of a shell and two stationary heads mounted on the inner drum inside the supports; means for rotating the shell of the outer drum; with a conduit connecting the stationary drum with one of the heads of the outer drum.

3. The combination of a fixed inner drum having end supports; heating means for said drum; an exhaust pipe for discharging gases from the drum; an outer drum consisting of a shell and two heads mounted between the supports for the inner drum and secured to the same at points some distance from the ends; with means for rotating said shell of the outer drum.

4. The combination of an outer drum having two ends and a shell; an inner drum projecting at each end beyond and carrying and fixed to the ends of the outer drum; supports for the projecting ends of the inner drum; heating means for the inner drum; and means for driving the shell of the outer drum, there being an exhaust opening in the upper portion of one of the heads of the outer drum to allow escape of gases therefrom.

5. The combination of an outer drum having two ends and a shell; an inner drum extending through and projecting at each end beyond the ends of the outer drum; supports for the projecting ends of the inner drum; heating means for the inner drum; means for driving the shell of the outer drum; and tie rods extending between the ends of the outer drum for adjusting the ends of the drum relatively to the rotating shell.

6. The combination in a drier and evaporater of a fixed inner drum closed at both ends; an outer drum consisting of a shell and two heads of which the latter are respectively mounted on and fixed to the inner drum at some distance from the ends thereof, said heads being provided with annular grooves within which are positioned the ends of the shell; and supports for the inner drum outside of the heads of the outer drum; and means for rotating the shell of the outer drum.

In witness whereof I affix my signature.

CHRISTOPHER OFFENHAUSER.